(12) United States Patent
Kim et al.

(10) Patent No.: US 8,425,675 B2
(45) Date of Patent: Apr. 23, 2013

(54) RECRYSTALLIZATION TYPE OF INK COMPOSITION

(75) Inventors: Chung Kyung Kim, Daejeon (KR); Han-Shin Jung, Daejeon (KR)

(73) Assignee: Dong-A Teaching Materials Co., Ltd. (KR)

( * ) Notice: Subject to any disclaimer, the term of this patent is extended or adjusted under 35 U.S.C. 154(b) by 373 days.

(21) Appl. No.: 12/797,153

(22) Filed: Jun. 9, 2010

(65) Prior Publication Data

US 2011/0303118 A1 Dec. 15, 2011

(51) Int. Cl.
*C09D 11/16* (2006.01)

(52) U.S. Cl.
USPC .................. 106/31.43; 106/31.58; 106/31.75; 106/31.86

(58) Field of Classification Search .............. 106/31.27, 106/31.43, 31.58, 31.6, 31.75, 31.86
See application file for complete search history.

(56) References Cited

U.S. PATENT DOCUMENTS

| | | | | |
|---|---|---|---|---|
| 5,213,613 A * | 5/1993 | Nagashima et al. | ....... | 106/31.43 |
| 5,580,373 A * | 12/1996 | Lane et al. | .................. | 106/31.43 |
| 6,200,372 B1 * | 3/2001 | Krishnan et al. | ........... | 106/31.75 |
| 6,709,503 B1 * | 3/2004 | Krishnan et al. | ........... | 106/31.75 |
| 7,267,716 B2 * | 9/2007 | Nagashima et al. | ......... | 106/31.6 |
| 7,303,620 B2 * | 12/2007 | Nagashima et al. | ......... | 106/31.6 |
| 7,396,398 B2 * | 7/2008 | Lee et al. | .................... | 106/31.43 |
| 7,488,381 B2 * | 2/2009 | Jackson | ...................... | 106/31.43 |
| 7,641,722 B2 * | 1/2010 | Lee et al. | .................... | 106/31.27 |
| 2002/0037947 A1 * | 3/2002 | Suzuki et al. | ................. | 523/160 |
| 2006/0173096 A1 * | 8/2006 | Ota | ............................... | 523/161 |
| 2007/0040881 A1 * | 2/2007 | Ham et al. | ................. | 106/31.43 |
| 2011/0088581 A1 * | 4/2011 | Crespi et al. | .................. | 101/483 |

FOREIGN PATENT DOCUMENTS

WO WO 2009/150132 A2 * 12/2009

* cited by examiner

*Primary Examiner* — Helene Klemanski
(74) *Attorney, Agent, or Firm* — Schwegman Lundberg & Woessner, P.A.

(57) ABSTRACT

A recrystallization type of ink composition comprises a solvent, a crystalline material, and a colorant. When the recrystallization type of ink composition is applied to a non-absorption surface such as a whiteboard, a glass surface, and a plastic surface, it is recrystallized to provide a visual effect of a metal sense at the applied part.

2 Claims, 3 Drawing Sheets

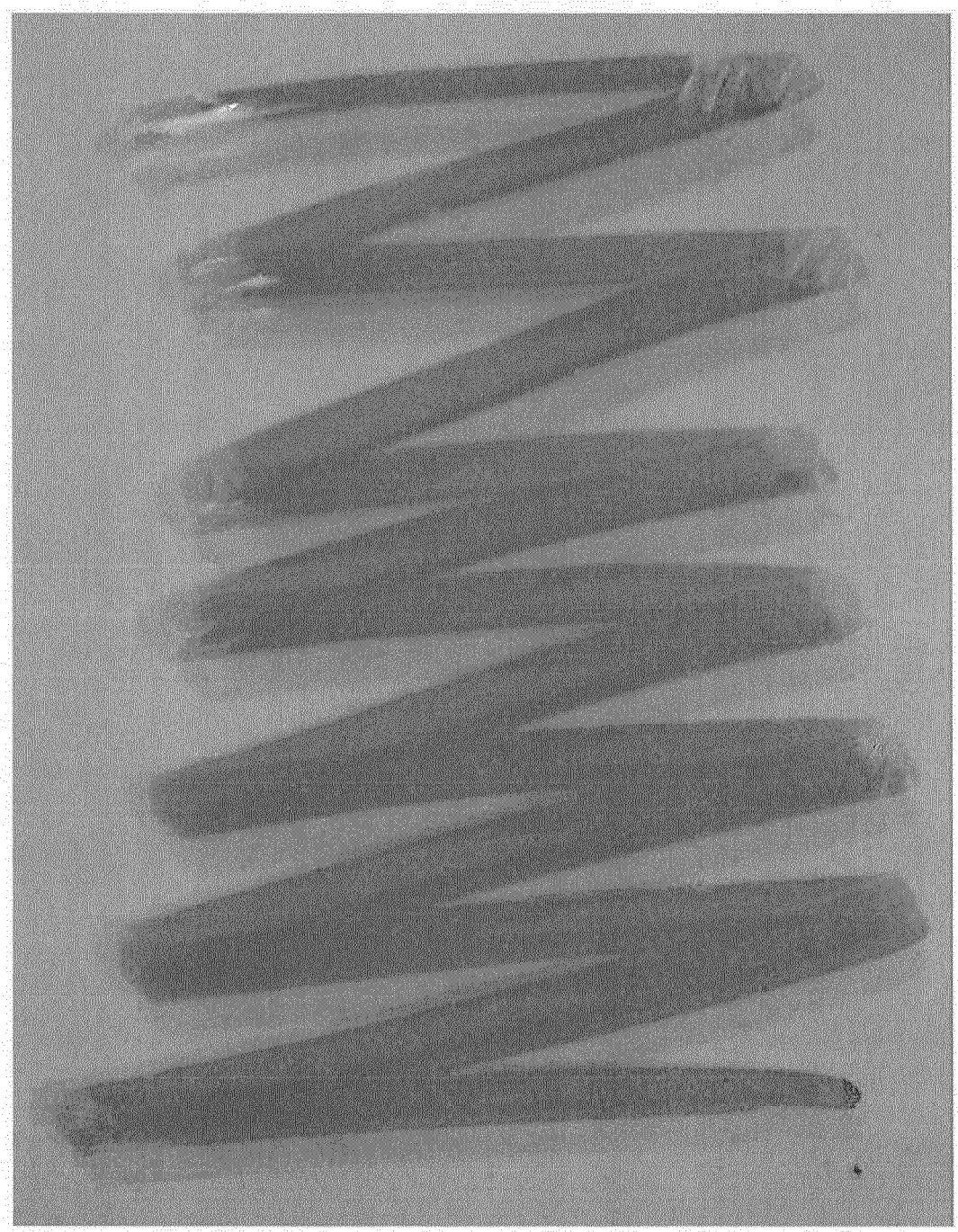
[FIG. 1]

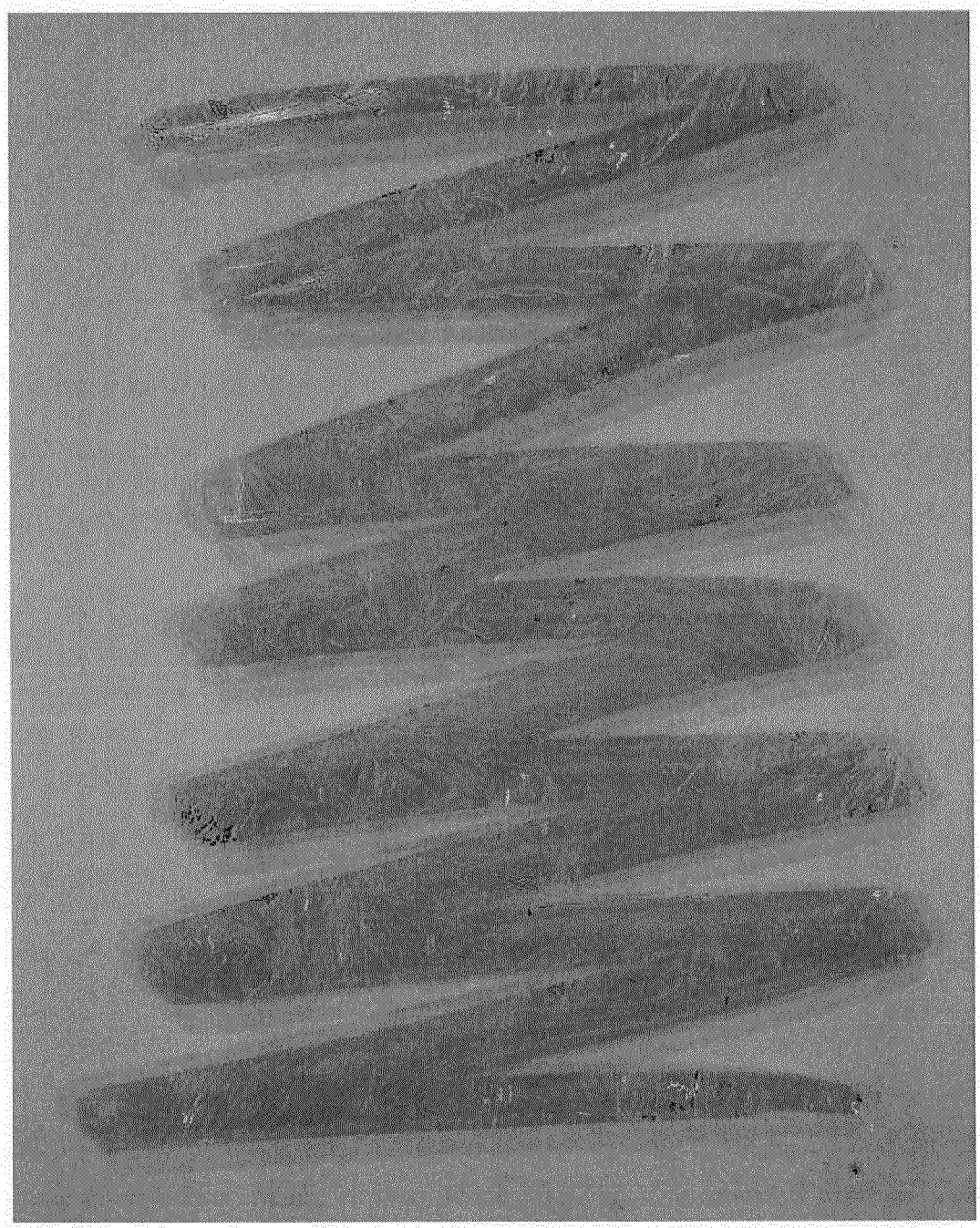
[FIG. 2]

[FIG. 3]
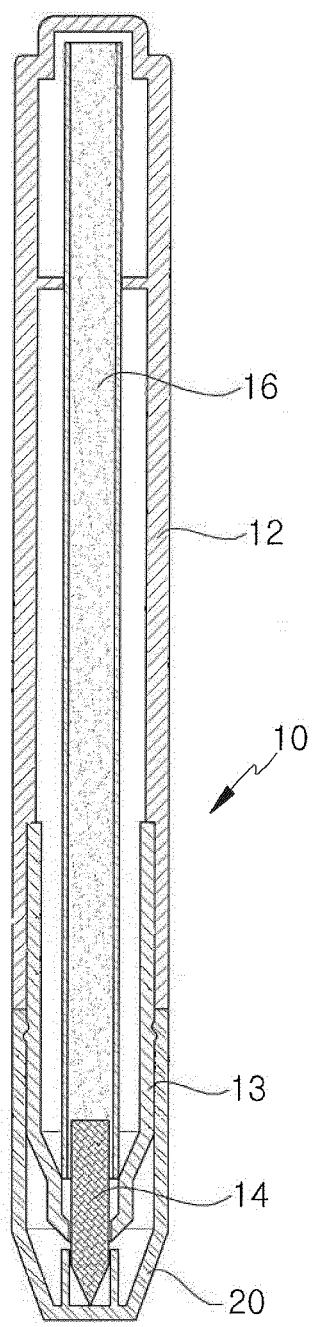

RECRYSTALLIZATION TYPE OF INK COMPOSITION

BACKGROUND OF THE INVENTION (a) Field of the Invention

The present invention relates to a recrystallization type of ink composition, and more particularly, to a recrystallization type of ink composition capable of obtaining a visual effect of expressing a metal sense at a part to which the recrystallization type of ink composition is applied according to a recrystallization phenomenon in which, when the recrystallization type of ink composition is applied to a non-absorption surface, as its solvent is evaporated, a dissolved crystalline material is recrystallized.

(b) Description of the Related Art

In general, an ink composition is applied to various mechanisms such as a copy machine, a printer, a stamp, writing instruments, and the like, to express patterns, characters, backgrounds, and the like, of desired colors.

As for the related art ink composition, the quality that its color is not changed during a period of durability is favored once it is printed, applied, or used for handwriting and the like, and most products of ink compositions have the characteristic that their colors do not change.

However, the print ink or stamp ink used for printers, copy machines, and the like are limited in their functions to simply express given colors, failing to fully satisfy diverse consumers' demands.

Thus, recently, in order to meet the consumers' demand for novelty and variety, a decolorization ink composition for handwriting allowing its color or the like to change with the passage of a certain time after the ink composition is used for printing or handwriting, a photochromic ink composition allowing for coloring and achromatizing as it absorbs or discharges light energy, and the like, have been developed and offered.

In addition, recently, among ink compositions that receive good reactions from consumers is an ink composition providing a visual effect of expressing a metal sense as it is used for printing or handwriting.

However, the related art ink composition providing a metal sense mainly uses a metallic pigment, which fails to provide a satisfying level of metal sense. Also, in the case of an ink composition using an inorganic pigment coated with a high specific gravity material, the weight of the ink composition increases and precipitation is likely to be generated while the ink composition is kept in storage, causing problems in that printing is not easy and the handwriting sense is degraded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a recrystallization type of ink composition having advantages of obtaining a visual effect of expressing a metal sense on a printed or coated region owing to a recrystallization phenomenon in which, when the recrystallization type of ink composition is printed or applied on a non-absorption surface such as a whiteboard, a plastic surface, a glass surface, and the like, a crystalline material dissolved in the solvent is recrystallized as the solvent is evaporated, thus providing beauty and novelty to users.

An exemplary embodiment of the present invention provides a recrystallization type of ink composition including a solvent, a crystalline material, and a colorant.

As the solvent, water or a lower alcohol may be used, or both may be used together.

The lower alcohol may be one or more selected from the group consisting of methyl alcohol, ethyl alcohol, and propyl alcohol.

The solvent may be used within the range of 20 wt % to 75 wt %.

Urea may be used as the crystalline material.

The urea may be used in a granular or powdery crystal form.

The urea may be used within the range of 20 wt % to 50 wt % of the entire weight.

If the usage amount of urea is less than 20 wt %, crystallinity of the urea is too degraded to manifest a metal texture, whereas if the usage amount of urea exceeds 50 wt %, the urea will not be easily dissolved in the solvent, leaving a precipitate.

A colored dye may be used as the colorant.

A color pigment may also be used as the colorant.

The colorant may be used within the range of 0.1 wt % to 30 wt %.

The recrystallization type of ink composition according to an exemplary embodiment of the present invention may further include one or more selected from the group consisting of a preservative, a wetting agent, and a surfactant.

According to an exemplary embodiment of the present invention, the recrystallization type of ink composition allows for obtaining a visual effect of expressing a metal sense when it is printed or applied on a non-absorption surface such as a whiteboard, a plastic surface, or a glass surface and is crystallized when a solvent is evaporated, thus providing beauty and novelty to users and arousing users' fresh interest.

Also, according to an exemplary embodiment of the present invention, the recrystallization type of ink composition does not use a high-priced metal pigment such as is used in the related art, so the manufacturing cost can be reduced.

In addition, according to an exemplary embodiment of the present invention, when the recrystallization type of ink composition is used for handwriting or applied on the surface of an OHP film or a whiteboard when giving lectures, classes, or presentations or in conducting a conference, seminar, or the like, by using an overhead projector (OHP), a whiteboard, or the like, a novel visual effect can be obtained, and thus participants' curiosity can be aroused and a learning effect in lectures or classes can be enhanced.

BRIEF DESCRIPTION OF THE DRAWINGS

FIG. 1 is a photograph of a state immediately after handwriting was performed by using a marker containing a recrystallization type of ink composition according to a first exemplary embodiment of the present invention.

FIG. 2 is a photograph of a state after the passage of 10 seconds after handwriting was performed by using a marker containing the recrystallization type of ink composition according to the first exemplary embodiment of the present invention.

FIG. 3 is a sectional view of the marker in which the recrystallization type of ink compositions according to first to fifth exemplary embodiments of the present invention are injected for coating.

DETAILED DESCRIPTION OF THE EMBODIMENTS

A recrystallization type of ink composition according to exemplary embodiments of the present invention will now be described.

Exemplary Embodiment 1

53.9 wt % of water as a solvent, 45 wt % of urea as a crystalline material, 1.0 wt % of C.I Acid Red 87 as a dye, and 0.1 wt % of a preservative were mixed at room temperature for one hour to obtain a red recrystallization type of ink composition.

The recrystallization type of ink composition according to the first exemplary embodiment of the present invention was received or accommodated in a marker configured as shown in FIG. 3, and then applied to a glass surface.

With reference to FIG. 3, the marker 10 includes a storage container 12, a porous pen nib 14 installed at a front end portion 13 of the storage container 12, an absorbing body 16 installed within the storage container 12 and absorbing and storing the recrystallization type of ink composition, and a cap 20 assembled to the front end portion 13 of the storage container 12 and hermetically sealing while surrounding the pen nip 14.

According to the results of applying the recrystallization type of ink composition on a glass substrate, as shown in FIG. 1, the recrystallization type of ink composition was seen as red immediately after it was applied, just like a commonly used marker including red ink. With the passage of ten seconds after the application, a visual effect that a metal sense is expressed from the applied parts was obtained.

Exemplary Embodiment 2

53.9 wt % of water as a solvent, 45 wt % of urea as a crystalline material, 1.0 wt % of 0.1 Acid Yellow 23 as a dye, and 0.1 wt % of a preservative were mixed at room temperature for one hour to obtain a yellow recrystallization type of ink composition.

Exemplary Embodiment 3

48.9 wt % of water as a solvent, 50 wt % of urea as a crystalline material, 1.0 wt % of C.I Acid Yellow 23 as a dye, and 0.1 wt % of a preservative were mixed at room temperature for one hour to obtain a yellow recrystallization type of ink composition.

Exemplary Embodiment 4

78.9 wt % of water as a solvent, 20 wt % of urea as a crystalline material, 1.0 wt % of C.I Acid Yellow 23 as a dye, and 0.1 wt % of a preservative were mixed at room temperature for one hour to obtain a yellow recrystallization type of ink composition.

Exemplary Embodiment 5

68.9 wt % of water as a solvent, 30 wt % of urea as a crystalline material, 1.0 wt % of C.I Acid Yellow 23 as a dye, and 0.1 wt % of a preservative were mixed at room temperature for one hour to obtain a yellow recrystallization type of ink composition.

Comparative Example 1

83.9 wt % of water as a solvent, 15 wt % of urea as a crystalline material, 1.0 wt % of C.I Acid Yellow 23 as a dye, and 0.1 wt % of a preservative were mixed at room temperature for one hour to obtain a yellow recrystallization type of ink composition.

Comparative Example 2

43.9 wt % of water as a solvent, 55 wt % of urea as a crystalline material, 1.0 wt % of C.I Acid Yellow 23 as a dye, and 0.1 wt % of a preservative were mixed at room temperature for one hour to obtain a yellow recrystallization type of ink composition.

As in the first exemplary embodiment of the present invention, the recrystallization type of ink composition according to the second to fifth exemplary embodiments of the present invention were applied to a glass surface (i.e., a non-absorption surface) by using such a marker as shown in FIG. 3.

It was noted from the above description that as the content of the crystalline material increases the duration for recrystallization becomes shorter, and when the content of the crystalline material is reduced, the size of the crystals after recrystallization was smaller to reduce the metal sense.

That is, it is noted that as the content of the crystalline material increases the content of the solvent is relatively reduced, making the solvent evaporate faster, and accordingly the applied surface was more quickly recrystallized.

In addition, a phenomenon such as when time-lapse photography of frost forming on a widow is played back quickly is seen mere seconds from a point when the recrystallization type of ink composition is applied to a point when it is completely recrystallized.

Thus, the recrystallization type of ink composition can newly arouse children's or users' interest, and can maximize an event effect.

In the case of Comparative Example 1, because the content of the crystalline material is relatively small, recrystallization was not sufficiently performed and a metal sense was too little to be easily recognized.

In the case of Comparative Example 2, the crystalline material was not completely dissolved but remained as a precipitate in the solvent, and it was noted that its application showed a degraded handwriting sense.

In the above description, the recrystallization type of ink compositions according to the exemplary embodiments of the present invention were applied to the marker, but the present invention is not limited thereto and the recrystallization type of ink compositions can be used for various purposes, such as printing ink for a copy machine, an inkjet printer, and the like, stamp ink, handwriting instrument ink for a felt-tip pen, and the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A recrystallization ink composition comprising 20 wt % to 75 wt % of a solvent, 20 wt % to 50 wt % of urea, and 0.1 wt % to 30 wt % of a colorant, wherein the recrystallization ink composition is formulated for use in a marker.

2. The composition of claim 1, wherein the solvent is at least one of water or a lower alcohol.

* * * * *